United States Patent [19]

Bhagwat et al.

[11] Patent Number: 4,913,448

[45] Date of Patent: Apr. 3, 1990

[54] SEALING ARRANGEMENT

[75] Inventors: Anil G. Bhagwat, Hemel Hempstead; Robert A. Carter, Springmead; Roger D. Masham, Ashwell, all of England

[73] Assignee: Xerox Corporation, Stamford, Conn.

[21] Appl. No.: 269,843

[22] Filed: Nov. 10, 1988

[30] Foreign Application Priority Data

Jan. 20, 1988 [GB] United Kingdom ................ 8801227

[51] Int. Cl.$^{4}$ ........................ F16J 15/16; F16J 15/54; G03B 27/00

[52] U.S. Cl. ........................................ 277/12; 277/80; 355/30; 355/215; 355/260

[58] Field of Search ........................... 277/12, 80, 227; 355/260, 30, 215

[56] References Cited

U.S. PATENT DOCUMENTS

| | | | |
|---|---|---|---|
| 2,974,981 | 3/1961 | Vervest et al. | 277/80 |
| 4,213,617 | 7/1980 | Salger | 277/80 V |
| 4,500,196 | 2/1985 | Shimura | 355/215 |

*Primary Examiner*—Allan W. Shoap

*Attorney, Agent, or Firm*—H. Fleischer; J. E. Beck; R. Zibelli

[57] ABSTRACT

A sealing arrangement for a container in which an auger having vanes is disposed in the chamber thereof for moving particulate material stored therein. A threaded sealing member is adapted to engage the auger vanes so as to be driven along the container on rotation of the auger. The sealing member is mounted slidingly within the container but is restrained from rotating about the auger. On rotating the auger, in one direction, the sealing member moves along the auger to a storage position located beyond the auger vanes.

4 Claims, 2 Drawing Sheets

SEALING ARRANGEMENT

This invention relates to a sealing arrangement for a container having an auger therein for moving particulate material stored therein. The invention is particularly, although not exclusively, useful as a transit seal for a xerographic cassette which includes an auger for dispensing particulate toner material from the container to the development apparatus of a xerographic copying machine.

In xerographic copying machines, especially the smaller, lower copy volume machines, there is an increasing use of a xerographic cassette in which some or most of the elements required to carry out the xerographic process are contained. For example, the cassette may contain a photoreceptor, a charge corotron, a developing device, a transfer corotron, and a cleaning device. The cassette may be inserted into, and removed from, the main body of a xerographic copying machine when it is desired to use different colored toner, or when a cassette is exhausted or otherwise needs replacement.

One type of xerographic cassette of the kind just outlined includes a supply of developer material, and is also provided internally with an auger for delivering replenishment toner to the development station, which typically includes a magnetic brush developer roll. The cassette, when supplied to the machine user, is loaded with developer material, and the problem arises that during shipment of the cassette, developer material may travel along the auger with a consequent risk of contamination of the cassette interior.

The present invention is intended to overcome this problem, and according to one aspect of the features of the present invention there is provided a sealing arrangement for a container of the type wherein an auger having vanes is disposed in the chamber thereof for moving particulate material stored therein. The improvement includes a threaded sealing member adapted to engage the auger vanes and to be driven along the container on rotation of the auger. The sealing member is mounted slidingly in the container and restrained from rotation about the auger so that on rotating the auger in a first direction the sealing member moves along the auger to a storage position located byond the auger vanes.

During assembly, the sealing member is threaded onto the auger, and the auger is rotated (in the direction opposite to its working direction, i.e. the first direction) to move the sealing member to a stop position within the auger housing. This forms a seal to prevent developer material from passing beyond the sealing member during shipment of the cassette. When the cassette is first used, the initial few revolutions of the auger drive the sealing member to the other end of the auger, and beyond the end of the auger vanes in a storage location, where the sealing member then stays, performing no further useful function.

Figure 1:
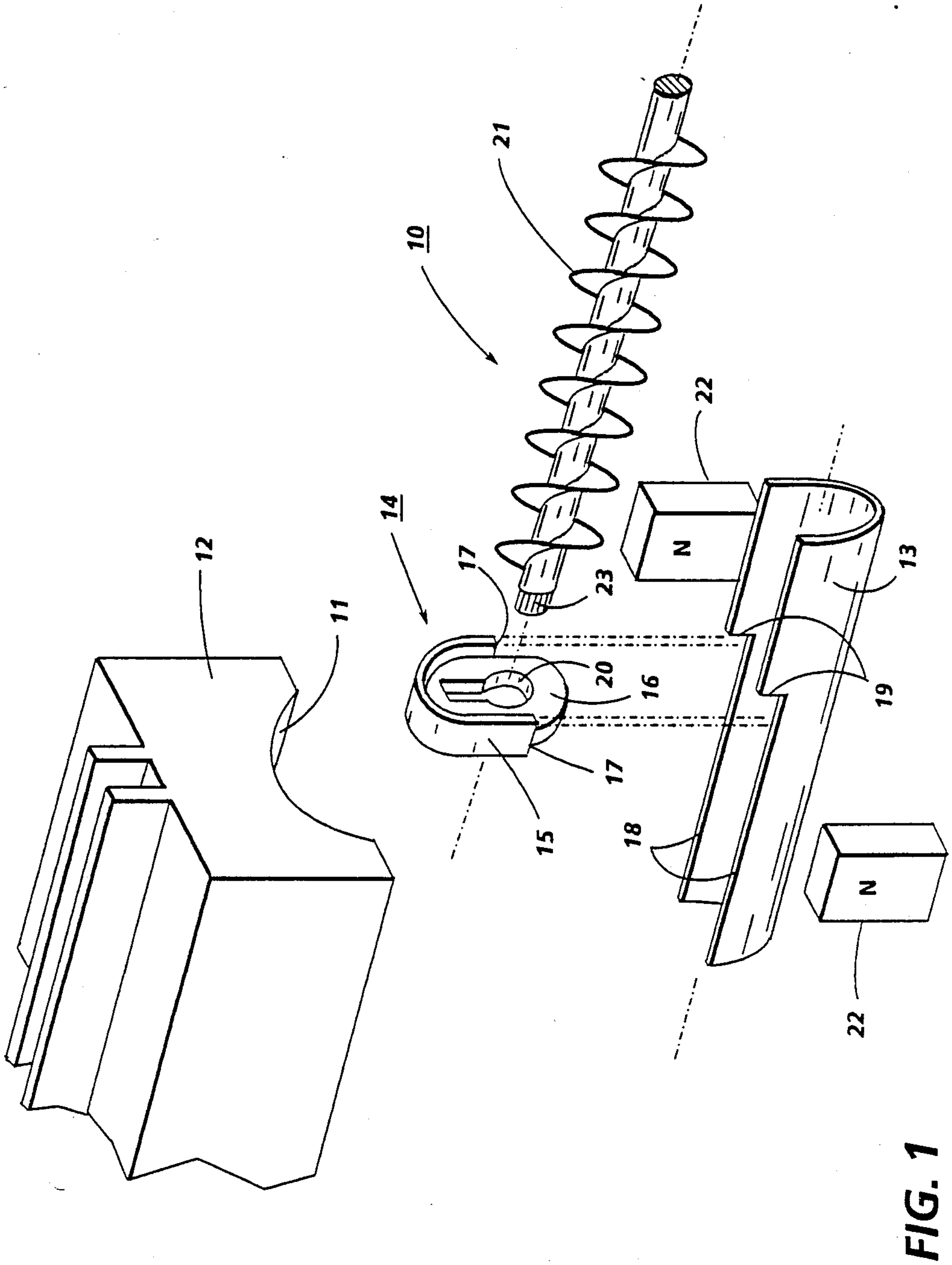
Figure 2:
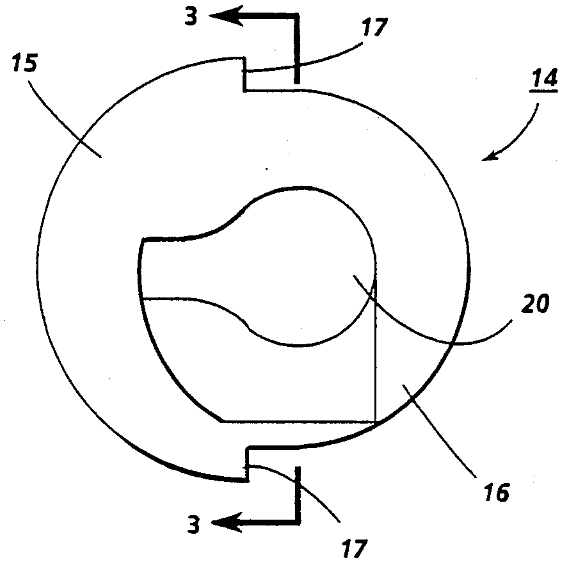
Figure 3:
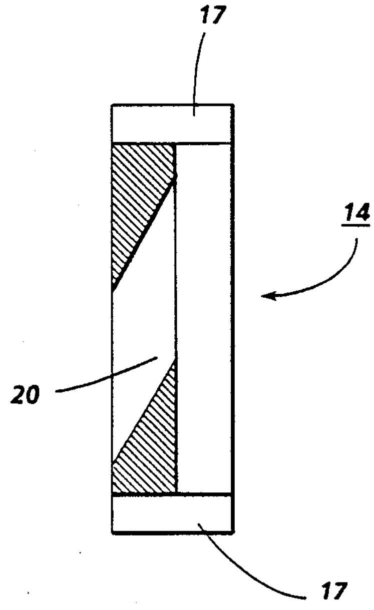
Figure 4:
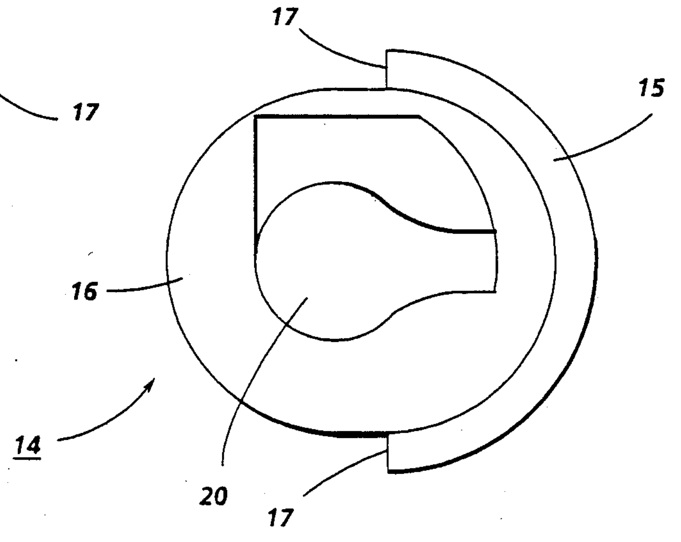

Other aspects of the present invention will become apparent as the following description proceeds and upon reference to the drawings, in which:

FIG. 1 is a fragmentary, exploded perspective view of the essential elements of an auger of a xerographic cassette incorporating the seal of the present invention therein, FIG. 2 is a front elevational view of the sealing member, FIG. 3 is a sectional elevational view taken along the line III—III of FIG. 2, and FIG. 4 is a rear elevational view of the sealing member.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention as defined by the appended claims.

Referring now to FIG. 1, there is shown an auger 10 which is mounted for rotation about its longitudinal axis within an auger housing defined by a part-cylindrical recess 11 in an upper portion of a xerographic cassette casing 12, and a U-shaped toner dispensing tube 13 in the lower part of the cassette. The left-hand part of the dispensing tube 13, as seen in FIG. 1, is of substantially half-cylindrical shape, whereas the right-hand part is of U-shaped cross-section.

In use, the auger is rotated counter-clockwise to convey toner from the right, as viewed in FIG. 1, towards the left of the dispensing tube 13 to dispense toner into the body of developer material in the developer station (not shown) of the cassette. The toner may be derived from a cartridge (not shown) which may be shipped separately from the cassette, and used to replenish toner consumed during the copying process.

During manufacture of the cassette, the developer material, including magnetizable carrier beads and toner powder, is loaded into the development station. To prevent the developer material from traveling back along the auger during shipping of the cassette and possibly causing damage, a sealing member 14 is used.

The sealing member 14 is shaped, as shown in detail in FIGS. 2 to 4, to slidingly fit within the auger housing. The upper part of the sealing member has an inverted U-shaped protrusion 15 adapted to slidingly fit within the recess 11. The lower portion 16 of the sealing member 14 is shaped to be a sliding fit within the dispensing tube 13. The lower ends 17 of the protrusion 15 form steps which slidingly engage the ledges 18 at the top of the left-hand part of dispensing tube 13, and positively prevent rotation of the sealing member 14. A shaped hole 20 in the sealing member 14 is formed in thread configuration, like a threaded nut, so a to engage the auger vanes 21. Thus, on rotation of the auger, the sealing member 14 is driven along the auger, in a direction depending on the direction of rotation of the auger.

With the sealing member on the auger, a seal is formed with the auger housing, i.e. between the sealing member and the recess 11 and dispensing tube 13. A more positive location of the sealing member may be provided by rotating the auger clockwise so as to drive the sealing member against stops 19 constituted by the steps between the left-hand and right-hand parts of the dispensing tube 13. During shipping, the auger drive may be secured with the seal in the 'stop' position described. In order to ensure a good seal, a resilient or compliant material, such as a plastics foam or a felted material, may be provided around the surfaces of the sealing member which slidingly engage the auger housing, as well as its surfaces which threadingly engage the auger vanes. The sealing member may be made entirely from such a material, provided the material is sufficiently rigid, or alternatively may be secured to a rigid, generally annular member. Alternatively to the resilient seal, or in addition, the sealing member may be formed of, or include, a magnetic material. This has the effect of attracting carrier particles to it in magnetic brush fashion, thereby enhancing the seal. In this way, escape of developer material during transit of the cassette may be efficiently prevented.

As an alternative to the use of a magnetic material in the sealing member, it may be made from a magnetizable material, such as soft iron. In this case, magnets 22, such as permanent magnets of a ferrite material, may be located outside the auger housing, on either side of the dispensing tube 13 adjacent the stops 19. Opposite poles of the two magnets face one another. When the sealing member 14 is located in the 'stop' position, the magnetizable material in the sealing member becomes magnetized, and provides additional sealing in magnetic brush fashion. Such magnets, if of sufficient magnetic strength, may be used to provide a magnetic brush.

When the cartridge is required for use, it is inserted into the copying machine, and the auger is rotated counter-clockwise by drive systems within the machine for dispensing toner as described above. The initial few rotations of the auger drive the sealing member 14 along the auger, to the left as shown in FIG. 1, until the sealing member passes the end of the auger vanes 21. A portion 23 of the auger shaft beyond the working area of the auger has no vanes, so the sealing member is no longer driven once it arrives at this portion of the auger shaft. It accordingly remains in that position, serving no further useful purpose, for the remainder of the life of the cassette. If the sealing member includes a magnetizable material, it will cease to be magnetic once it has been driven away from the 'stop' position adjacent the magnets.

It is, therefore, evident that there has been provided, in accordance with the present invention, a sealing arrangement that fully satisfies the aims and advantages hereinbefore set forth. While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. A sealing arrangement for a container of the type wherein an auger having vanes is disposed in the chamber thereof for moving particulate material stored therein, wherein the improvement includes a threaded sealing member adapted to engage the auger vanes and to be driven along the container on rotation of the auger, said sealing member being mounted slidingly in the container and being restrained from rotation about the auger so that on rotating the auger in a first direction said sealing member moves along the auger to a storage position located beyond the auger vanes.

2. A sealing arrangement according to claim 1, further including stop means on the container whereby said sealing member may be driven against said stop means by rotating the auger in a second direction opposite to the first direction of rotation of the auger.

3. A sealing arrangement according to claim 2, wherein said sealing member includes a magnetic material.

4. A sealing arrangement according to claim 2, wherein said sealing member includes:

a magnetizable material; and at least one magnet located outside the container adjacent said stop means so that said magnetizable material becomes magnetic when said sealing member is in the region of said stop means.

* * * * *